E. HOPKINSON.
APPARATUS FOR MANUFACTURING PNEUMATIC TIRES FOR VEHICLES.
APPLICATION FILED JAN. 31, 1918.
1,289,768.
Patented Dec. 31, 1918.
2 SHEETS—SHEET 1.
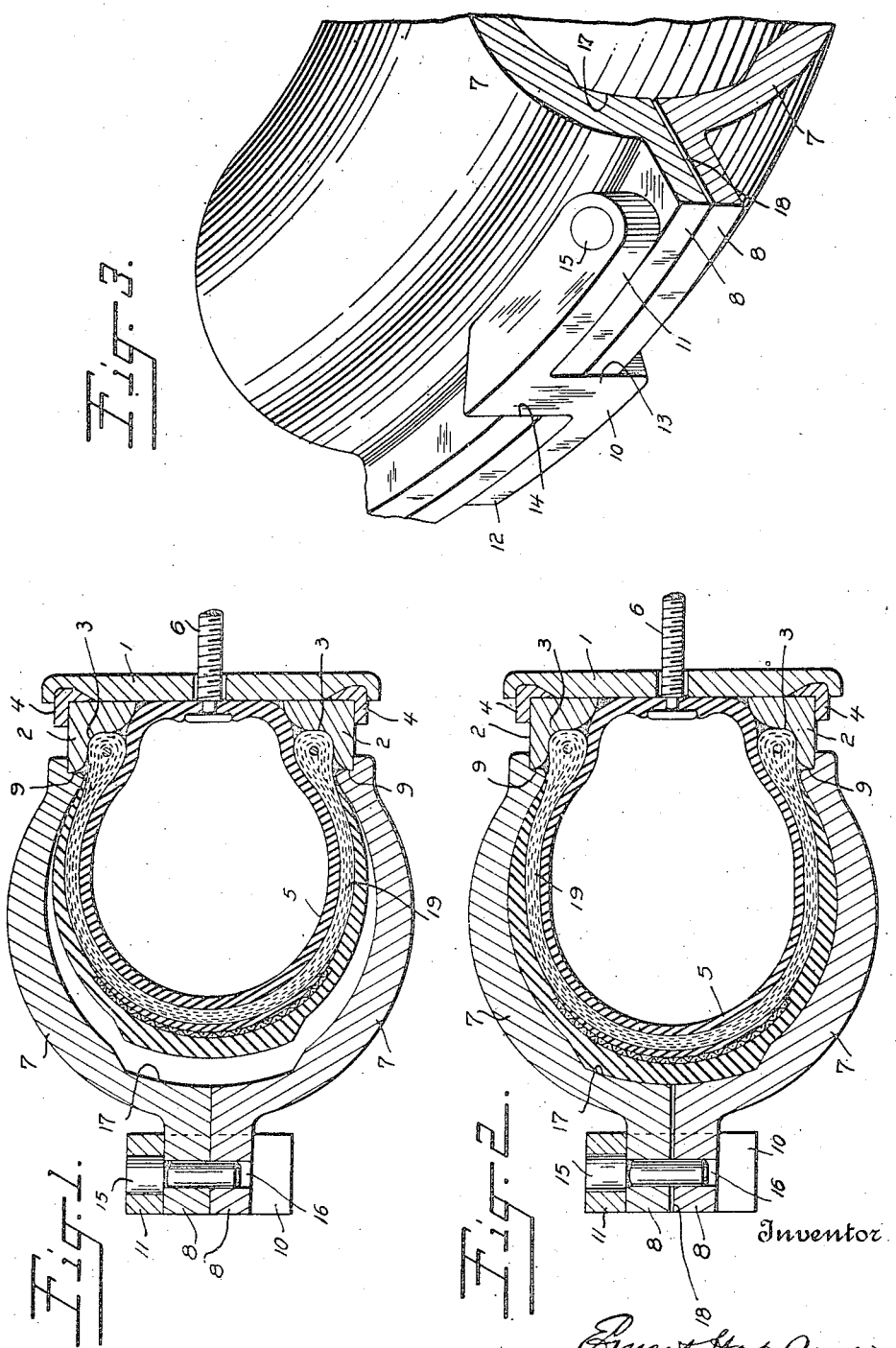
Inventor
Ernest Hopkinson Inventor
Ernest Hopkinson

UNITED STATES PATENT OFFICE.

ERNEST HOPKINSON, OF NEW YORK, N. Y.

APPARATUS FOR MANUFACTURING PNEUMATIC TIRES FOR VEHICLES.

1,289,768.

Specification of Letters Patent.

Patented Dec. 31, 1918.

Application filed January 31, 1918. Serial No. 214,608.

*To all whom it may concern:*

Be it known that I, ERNEST HOPKINSON, a citizen of the United States, residing in New York city, county and State of New York, have invented certain new and useful Improvements in Apparatus for Manufacturing Pneumatic Tires for Vehicles, of which the following is a full, clear, and exact description.

This invention relates more particularly to apparatus adapted for use in manufacturing pneumatic tires in accordance with the method as disclosed in my co-pending application, Serial No. 212,517.

Referring to the drawings:—

Figure 1 is a transverse sectional view of the apparatus showing the tire casing supported in its initial position.

Fig. 2 is a similar view to Fig. 1 showing the tire casing in its stretched position supported both interiorly and exteriorly.

Fig. 3 is a fragmental perspective view illustrating a ready means of clamping the external confining members together.

Figure 5:
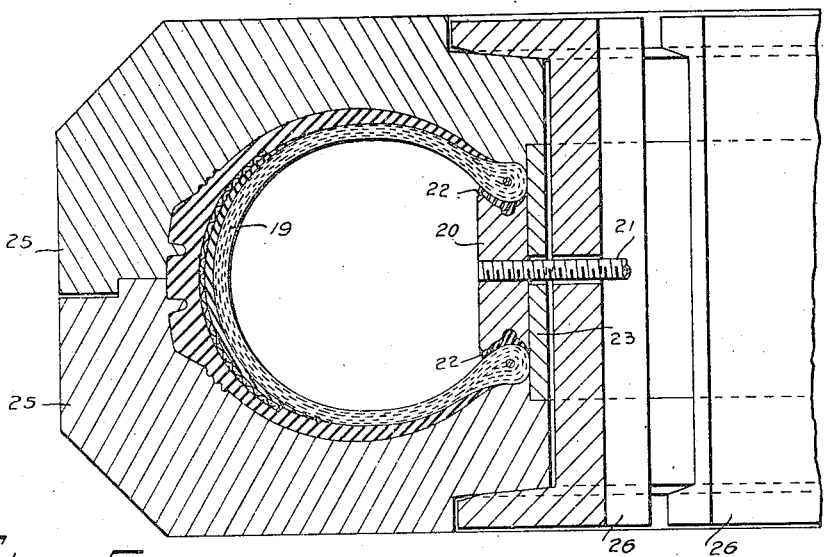
Fig. 5 is a view similar to Fig. 4 showing the tire casing brought to final tire shape and ready for vulcanization.

In the method disclosed in my above mentioned co-pending application, the final vulcanization of the casing is carried out while it is under a fluid pressure applied directly to the interior wall thereof. It has been found desirable in the manufacture of pneumatic tires to subject the fiber comprised in the carcass to the influence of a fluid under pressure in order to effect a stretching or straightening of the threads or cords composing the plies and then while thus stretched or straightened and while under the influence of the fluid pressure to subject the casing to the vulcanizing treatment. Attempts have been made to subject the casing to the influence of fluid pressure directly applied to accomplish the above purpose, but previous to my invention they have met with failure which I attribute to the fact that the rubber between the threads offers a less resistance than the resistance of the threads themselves with the result that the fluid under pressure enters the body of the casing through the interstices of the fabric or between the threads or cords and causes a spongy or blown condition and separation of the threads and plies when finally vulcanized. These defects apparently originate during the stretching of the casing rather than after it has been finally stretched, although of course it is the final vulcanization that permanently fixes the casing in its defective condition.

In my above mentioned co-pending application I have disclosed a method based on my discovery that if the stretching or straightening of the threads or cords composing the casing is accomplished by means of fluid pressure transmitted to the interior of the casing by a separating wall, such as for instance an inflatable tube or air bag, and a proper length of time is allowed to permit re-adjustment of the threads or cords and rubber component in the stretched casing, the fluid pressure may be thereafter applied directly to the interior wall of the casing without the before-mentioned disastrous results.

During the period allowed for re-adjustment and setting of the cords in their straightened or stretched condition, it is desirable also to subject the casing to a compacting pressure, that is to say, to subject it interiorly to a fluid pressure in excess of that necessary to bring it to the required size. A pressure of this magnitude, especially where the casing is in a warmed-up condition which I prefer to give it as a step preliminary to stretching, would result in overstretching the casing and to prevent this and to give the casing the approximate shape of the finished tire, I have devised an apparatus which provides exterior sizing walls which defines the shape and limits the size of the tire casing and which coöperates with the inflatable member to compact the wall and assist in permanently setting the threads or cords in the carcass in their stretched or straightened condition.

The apparatus in its preferred embodiment comprises a support for the casing, and in the present instance is composed of a rim 1 upon which are symmetrically mounted in slidable engagement therewith two endless rings 2—2 which have appropriate and preferably rounding oppositely disposed shoulders or seats 3 for supporting the beads or edges of the casing at their base and exterior side faces. The rings 2—2 are held against outward movement by means of split locking rings 4—4. The rim 1 further supports the stretching or shaping member which in the present instance is in the form of a rubber tube 5 provided with a valve stem 6 which passes through the rim and which is for the purpose of inflating the tube and may be of the usual inner-tube-valve construction.

The outer confining means, in the preferred embodiment of my invention, consists of two circumferential members 7—7 provided with the oppositely disposed peripheral flanges 8—8 for securing the members together, and the inner circumferential shoulders or grooves 9—9 which engage the outer edges of the rings 2 to insure an accurate alinement of the several parts and the desired positioning of the tire supported within the cavity thus formed.

While the members 7—7 may be held together in numerous ways, it is highly desirable that a device capable of quick application should be used in order that the parts may be readily assembled and disassembled. I have accordingly provided a plurality of latch members one of which is shown at 10. These are somewhat Z-shaped in general contour, having one of their ends as the end 11, pivoted to one of the flanges 8 and the other end 12 serving as a handle for raising and lowering the latch about the pivotal connection. The cross-bar 13 is preferably wedge-shaped transversely and engages correspondingly alined wedge-shaped grooves 14 formed in the flanges. To insure accurate alinement of these grooves, I have extended the pivotal pin 15 beyond the inner face of the engaging flange through which it passes and have provided the opposite flange with an orifice 16 for engaging the extended end of the pin.

The outer confining members are preferably constructed of comparatively light material and as no high degree of accuracy is required in their contour, they may be comparatively rough, for instance, stamped steel shells may be employed without any finishing. They should however when combined define a space substantially as large as the casing when finished and, with advantage, may be slightly larger, so that as the casing cools and the fluid pressure is removed, it will be substantially the size and shape of the finished tire, and to this end a tread cavity 17 is preferably formed in the members to produce a general outline of the tread. The space 18 in Fig. 2 indicates simply the rough fit of the members 7—7, which will be slightly spread apart under the inflation pressure as indicated in Fig. 2. In fact the walls of the confining means may have depressions to block off in the rubber comprising the exterior of the casing, configurations corresponding in the rough to the configurations that will ultimately be formed in the finished tire.

While I have described a special type of support for the tire, I do not wish to limit my invention to any particular type. The present one is that shown in my before-mentioned co-pending application and reference may be made thereto for a fuller description of the manner in which the several parts composing the support operate during the previous steps of the method there described. The present invention is not confined to any particular method of building tires, for the tire casing 19 may be composed of either thread fabric, cords, or woven fabric, and the tire may have been assembled and given partial formation upon a rigid core or in any other well-known or preferred manner.

In setting forth the advantages of my present invention the operation will be described for illustrative purposes, in connection with the method set forth in my above mentioned co-pending application. In this regard it is sufficient to state in the present instance, that after the flat pulley band from which the casing 19 is formed, has been constructed, it is mounted upon the rim 1 and upon the deflated tube 5. The tube is then inflated which forces the central portion of the band outwardly while the beads or edge portions are moved toward each other. The rings 2 are maintained in contact with the edges of the casing and are caused to move with them as they are brought toward each other as are also the split rings 4—4. The fluid pressure is gradually admitted through the valve stem 6 to the interior of the tube 5 until the casing attains the shape approximately that shown in Fig. 1 at which time the split rings spring into the engaging grooves formed in the rim 1 and thereby confine the beads of the tire against spreading apart. Where the casing is built upon a core, it is only necessary to mount the casing after it has been removed from the core directly upon the rim 1 with the inner tube 5 disposed within the casing, the supporting rings 2 and locking rings 4 are then placed in position in an obvious manner and the inner tube subjected to the fluid pressure until the tire is given the required shape as shown in Fig. 1. The exterior confining members 7—7 are then placed in their relative positions as shown in Fig. 1 and quickly secured together by the latches 10. Additional fluid pressure is then applied to the tube and the threads or cords composing the casing are further stretched or straightened out until this action is arrested by the tire casing coming into contact with the rigid confining walls of the members 7. This treatment will be enhanced if the casing has been previously subjected to a warming treatment. The interior is then given the required fluid pressure to give the desired compaction to the tire walls which may in some instances be 150 pounds to the square inch and while thus under the influence of the internal fluid pressure and external resistance of the rigid confining walls, the casing is allowed to remain for a suitable period, depending somewhat upon the temperature of the casing, until a permanent or substantially permanent setting of the cords has been attained. The tube 5 is then deflated, the members 7—7 disassembled, as well as the rings 2 and 4, and the casing removed.

Figure 4:
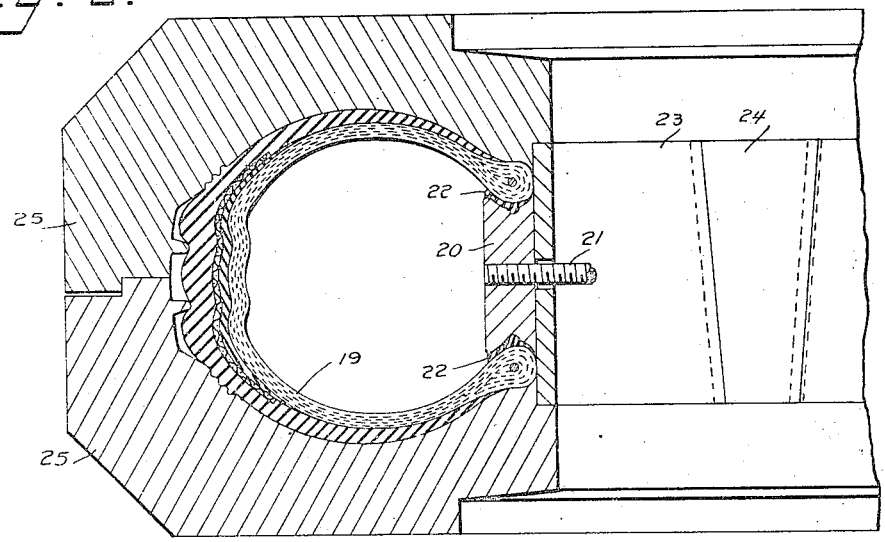
Fig. 4 is a transverse sectional view of a vulcanizing mold and shows the tire casing after it has been treated as shown in Fig. 2 and placed in the molds.

The tire when removed from this apparatus will have approximately the shape and size of the final tire and is ready for the subsequent treatment and final vulcanization. Figs. 4 and 5 represent a convenient form of mold for carrying out the final vulcanization and shows two steps in the subsequent treatment of the casing. The casing 19 is mounted upon what may be termed a bull-ring 20 provided with a valve stem 21 and the sealing rings 22. The bull-ring is supported upon an expansion ring 23 which is provided with the wedge-shaped segment 24 which serves to expand the ring in an obvious manner which effects a compressing of the edges of the tire to give it the exact diameter it should assume when finally vulcanized. The mold members 25 are then placed about the casing and clamped together by the clamps 26, which are more fully described and claimed in my co-pending application Serial No. 214,609. The members are preferably forced together by hydraulic or other pressure previous to applying the clamps. The tire casing having been previously brought to substantially the shape of the mold cavity but being comparatively cold, it will be distorted temporarily into approximately the shape shown in Fig. 4. After the molds have been secured by the clamps, the molds are then placed in suitable vulcanizing apparatus, and the heat applied. The rubber is thus softened, whereby the fluid pressure admitted through the valve stem 21 will result in forcing the casing and causing the rubber to flow into the mold recesses and into close engagement with the walls of the mold as clearly shown in Fig. 5. The fluid is then maintained at the desired pressure until the tire is finally vulcanized.

In subjecting the casing to the direct action of the fluid pressure I prefer to employ a fluid that will have no deleterious effect upon the rubber, and I have found that satisfactory results may be attained by employing carbon-dioxid, although steam or such gases as ammonia, nitrogen and the like may be used if desired.

As many apparently widely different embodiments of this invention may be made without departing from the spirit thereof, it is to be understood that I do not intend to limit myself to the specific form of embodiment of the invention herein described.

Having thus described my invention what I claim and desire to protect by Letters Patent is:

1. Apparatus for use in shaping and setting a pneumatic tire casing prior to final formation and vulcanization which comprises a support for the tire casing spanning the edges thereof, means for confining the edges of the casing to prevent outward lateral movement, a fluid-expansible hollow inner support for the casing, means for introducing the expanding fluid to the interior of the inner support, and exterior confining means adapted to react upon the casing for compacting the wall thereof when subjected to a pressure by the inner support in excess of the forming pressure.

2. Apparatus for use in shaping and setting a pneumatic tire casing prior to final formation and vulcanization which comprises a rim for supporting and spanning the tire casing at the edges thereof, means supported by the rim for confining the edges of the casing to prevent outward lateral movement, a fluid-expansible hollow inner support for the casing, means for introducing the expanding fluid to the interior of the inner support, and exterior confining means adapted to re-act upon the casing for compacting the wall thereof when subjected to a pressure by the inner support in excess of the forming pressure.

3. Apparatus for use in shaping and setting a pneumatic tire casing prior to final formation and vulcanization which comprises a rim for supporting and spanning the tire casing at the edges thereof, rings mounted on the rim for confining the edges of the casing to prevent outward lateral movement, a fluid-expansible hollow inner support for the casing, means for introducing the expanding fluid to the interior of the inner support, and exterior confining means adapted to re-act upon the casing for compacting the wall thereof when subjected to a pressure by the inner support in excess of the forming pressure.

4. Apparatus for use in shaping and setting a pneumatic tire casing prior to final formation and vulcanization which comprises a support for the tire casing spanning the edges thereof, means for confining the edges of the casing to prevent outward lateral movement, means for locking the confining means in operable positions, a fluid-expansible hollow inner support for the casing, means for introducing the expanding fluid to the interior of the inner support, and exterior confining means adapted to re-act upon the casing for compacting the wall thereof when subjected to a pressure by the inner support in excess of the forming pressure.

5. Apparatus for use in shaping and setting a pneumatic tire casing prior to final formation and vulcanization which comprises a support for the tire casing spanning the edges thereof, means for confining the edges of the casing to prevent outward lateral movement, a fluid-expansible hollow inner support for the casing, means for introducing the expanding fluid to the interior of the inner support, and exterior confining means engaging the first mentioned confining means, adapted to re-act upon the casing for compacting the wall thereof when subjected to a pressure by the inner support in excess of the forming pressure.

6. Apparatus for use in shaping and setting a pneumatic tire casing prior to final formation and vulcanization which comprises a support for the casing, a fluid-expansible hollow inner support for the casing, means for introducing the expanding fluid to the interior of the inner support, and exterior confining means formed in sections having oppositely disposed peripheral extensions, adapted to re-act upon the casing for compacting the wall thereof when subjected to a pressure by the inner support in excess of the forming pressure, and a plurality of latch members adapted to engage the extensions to hold the sections together.

7. Apparatus for use in shaping and setting a pneumatic tire casing prior to final formation and vulcanization which comprises a fluid-expansible hollow inner support for the casing, means for introducing the expanding fluid to the interior of said hollow support, an integral support having its central portion supporting said hollow support and adapted to span the edges of the casing to adapt its outer portions to serve as supports therefor said portions being fixed as regards movement in their respective planes relative to each other, said supports coöperating when the fluid is introduced to support the casing in a partially formed stage, exterior confining means formed in sections adapted to be placed about the said partially formed casing for re-acting thereupon for compacting the wall thereof when subjected to a pressure by the hollow support in excess of the forming pressure, one of said sections being adapted to engage the casing about one side thereof and another of said sections being oppositely disposed to the first section for engaging the opposite side of the casing, and fastening means independent of the exterior confining means and directly engaging said oppositely disposed sections thereof for securing the sections together.

8. Apparatus for use in shaping and setting a pneumatic tire casing prior to final formation and vulcanization which comprises a fluid-expansible hollow inner support for the casing, means for introducing the expanding fluid to the interior of the hollow support, an integral support having its central portion supporting said hollow support and adapted to span the edges of the casing to adapt its outer portions to serve as supports therefor said portions being fixed as regards movement in their respective planes relative to each other, exterior confining means formed in sections adapted to re-act upon the casing for compacting the wall thereof when subjected to a pressure by the inner support in excess of the forming pressure, one of said sections being adapted to engage the casing about one side thereof and another of said sections being oppositely disposed to the first section for engaging the opposite side of the casing, said confining means having an inner wall roughly conforming to the final configuration of the outer surface of the finished casing and comprising depressed portions to roughly block out the rubber stock corresponding to the final configurations produced in the finished article, and fastening means independent of the exterior confining means and directly engaging the said oppositely disposed sections thereof.

9. Apparatus for use in shaping and setting a pneumatic tire casing prior to final formation and vulcanization which comprises a fluid expansible hollow inner support for the casing, means for introducing the expanding fluid to the interior of said hollow support, supporting means comprising a central portion supporting said hollow support and end portions for supporting respectively the two edges of the casing, said portions being fixed against relative movement in their respective planes, said supports coöperating when the fluid is introduced to support the casing in a partially formed stage, and exterior confining means adapted to re-act upon the casing for compacting the walls thereof when subjected to pressure by the interior support in excess of the forming pressure.

Signed at New York, N. Y., this 30th day of January, 1918.

ERNEST HOPKINSON.